United States Patent Office 3,244,875
Patented Apr. 5, 1966

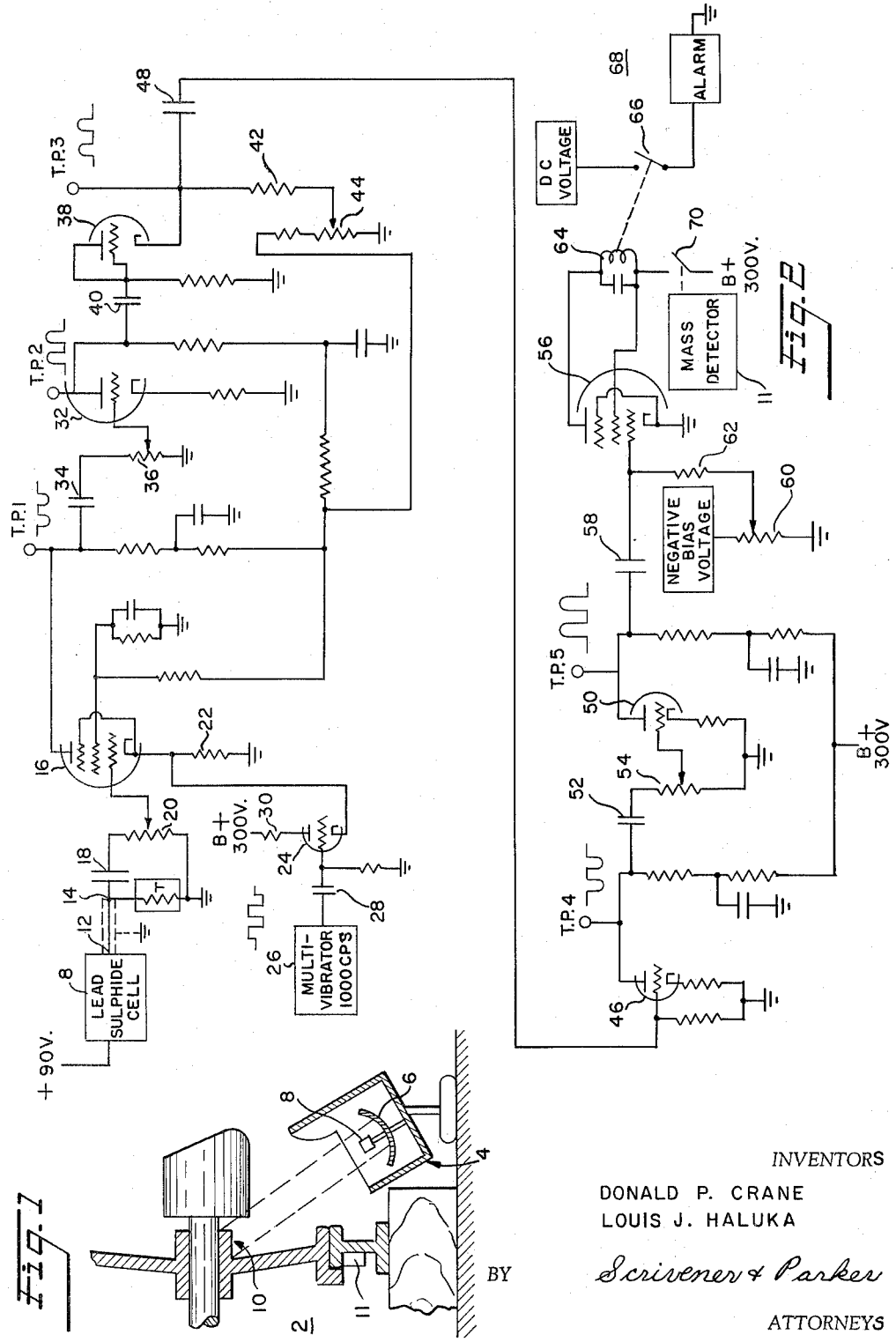

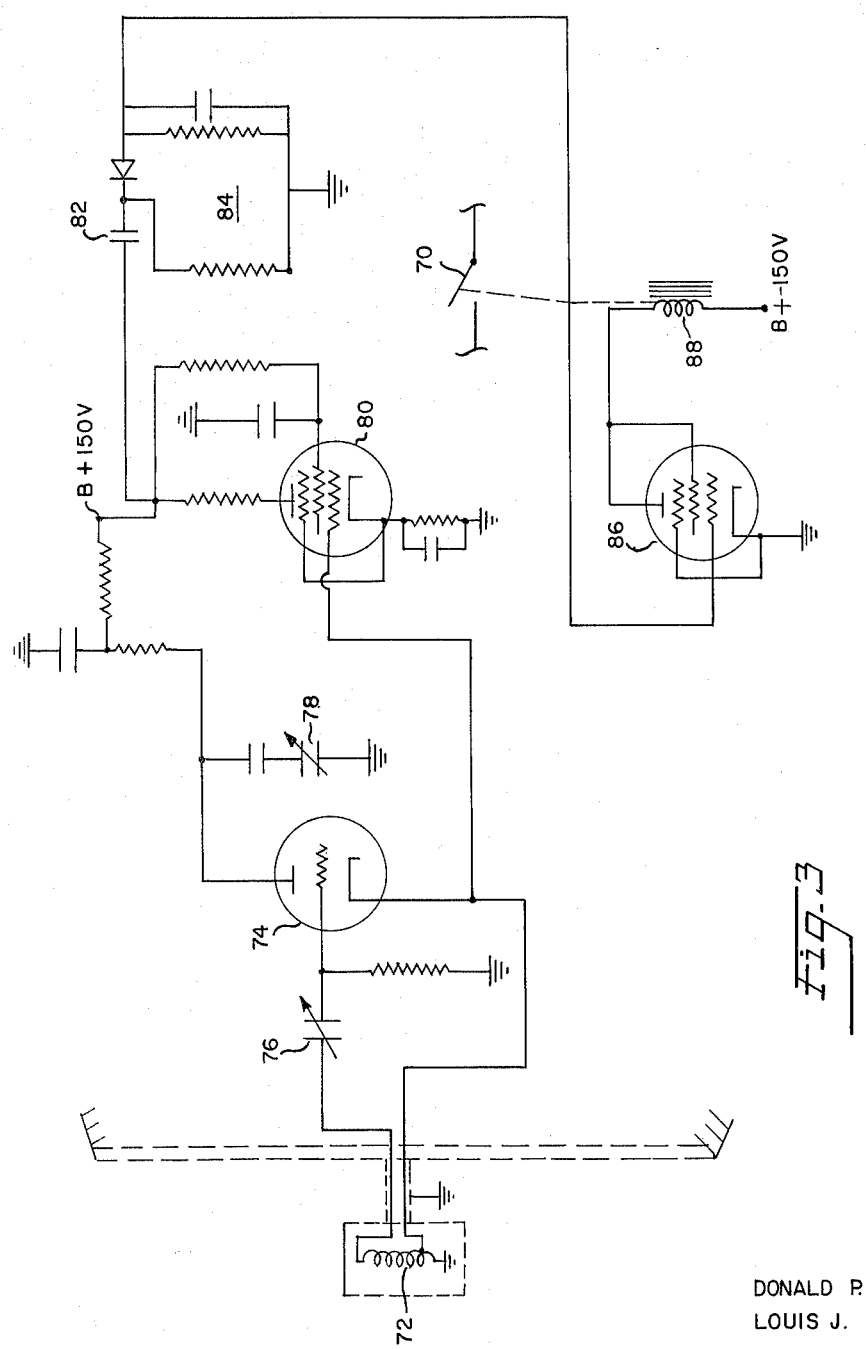

3,244,875
ELECTRONIC HOT BEARING DETECTOR
Donald P. Crane, 905 Ruth St., and Louis J. Haluka, 3062 Fadette St., both of Pittsburgh, Pa.
Filed Aug. 9, 1963, Ser. No. 301,027
9 Claims. (Cl. 246—169)

This invention relates generally to a completely electronic hot-bearing detector, and more particularly to a hot-bearing detector system including multivibrator-controlled gating means.

Various types of complex and expensive detecting systems have been developed in recent years for automatically monitoring the hot temperatures of trains travelling at high speeds thereby. It is conventional in the art to provide mechanical chopper or shutter means for interrupting the infrared energy emanating from a hot box, thereby to afford a pulsating signal which may be more readily amplified for subsequent detection and/or measurement. The use of such mechanical chopper means causes the system to be relatively complex and expensive and to require frequent servicing and maintenance. Owing to the relatively low chopping frequencies, the accuracy of the measurements obtained by the known devices is undesirably low.

An object of the present invention is to provide a wholly electronic system for accurately detecting hot bearings on a train travelling at a high speed past a stationary inspection station.

A more specific object of the invention is to provide a hot-bearing detector including infra-red responsive means for generating heat signals as a function of the temperature of a wheel-axle junction, means for amplifying said heat responsive signals, alarm means, and means for operating said alarm means when the amplified heat responsive signals exceed a predetermined value. The invention is characterized by the provision of multivibrator means for periodically gating said amplifier means whereby the heat information is superimposed upon alternate half cycles of a square wave signal. Following amplification of this signal, adjustable clipping level control means serve to remove all traces of the multivibrator signal whereupon the magnitude of the resultant unipolarity heat signal is a direct function of bearing temperature. The alarm means are operated when this resultant heat signal has a magnitude which exceeds that of an adjustable direct-current biasing or comparison potential of opposite polarity. The system includes a pair of potentiometers for affording accurate clipping level and biasing level control. As a consequence of these adjusting means, the deleterious effects of variations in ambient temperature are avoided, and accurate adjustment of the response of the system is permitted.

A further object of the invention is to provide a hot bearing detector including improved mass detector means for activating the system in response to the presence of railway rolling stock.

Other objects and advantages of the invention will become apparent from a study of the following specification when considered in conjunction with the accompanying drawing, in which:

FIG. 1 illustrates one of the lead sulphide temperature-responsive pick-up means mounted adjacent one side of a railway track;

FIG. 2 is a schematic diagram of the electronic control system of the present invention; and FIG. 3 is a schematic diagram of the mass detector actuating means.

Referring first to FIG. 1, mounted adjacent opposite sides of the railway track 2 are two stationary housings 4 each of which includes a parabolic mirror 6 for reflecting infrared energy upon a radiant energy responsive lead sulphide cell 8 mounted at the focal point of the mirror. The housing 4 and mirror 6 are so arranged that the radiant energy emanating from successive wheel-axle junctions 10 of railway rolling stock passing thereby is directed upon cell 8. Mass detector head 11 is mounted on one of the rails on the opposite side thereof from housing 4.

Referring to FIG. 2, one terminal of cell 8 is connected with a 90 volt D.C. source, and the other terminal is connected, via shielded cable 12, with the input terminal 14 of the electronic control circuit. Temperature responsive signals developed by cell 8 are applied to the control grid of first amplifier tube 16 via capacitor 18 and potentiometer 20. The cathode of tube 16 is connected with ground via cathode resistor 22. Tube 16 is preferably a tube having a sharp cut-off characteristic (for example, a 6AU6 pentode).

Drive tube 24 also has a cathode connected with ground via cathode resistor 22. Square wave signals developed by the 1000 c.p.s. multivibrator 26 are applied to the control electrode of drive tube 24 via capacitor 28. The plate of tube 24 is connected with battery B+ via plate resistor 30.

The plate of first amplifier tube 16 is connected with the control electrode of amplifier tube 32 via capacitor 34 and potentiometer 36. The signal appearing on the plate of tube 16 may be observed by connecting an oscilloscope at test point T.P. 1. The signal appearing at the plate of tube 32 (which signal may be observed at test point T.P. 2) is applied to the control grid of tube 38 via capacitor 40. The plate and control electrodes of tube 38 are interconnected, and consequently the tube affords diode action. The cathode of tube 38 is connected with ground via resistor 42 and the adjustable tap of potentiometer 44. Consequently the position of the tap of potentiometer 44 determines the cathode potential of tube 38. The signal appearing at the cathode of tube 38 (which signal may be observed at test point T.P. 3) is applied to the control grid of tube 46 via capacitor 48. The signal appearing at the plate of tube 46 (which may be viewed at test point T.P. 4- is applied to the control grid of tube 50 via capacitor 52 and potentiometer 54. The signal appearing at the plate of tube 50 is positive going and may be observed at test point T.P. 5. This signal is applied to the control grid of pentode 56 via capacitor 58. It is important to note that an adjustable negative biasing potential is also applied to the control grid of tube 56 via potentiometer 60 and resistor 62. In the plate circuit of tube 56 is connected the relay winding 64 of a normally-open switch 66 which actuates alarm circuit 68. The plate circuit of tube 56 includes also a normally-open relay contact 70 the operation of which is controlled by mass detector 11. Temperature compensation of the above-described system is obtained in a conventional manner, as for example, by the use of thermistor means.

Referring now to FIG. 3, the mass detector 11 includes a pick-up coil 72 enclosed in plastic in a small housing fastened on the opposite side of a rail from the housing 4. In this manner, the device is responsive to the tread of a wheel rather than the flange. One side of coil 72 is connected with the grid of triode oscillator tube 74 via variable coupling capacitor 76, and the other side of the coil is connected with a cathode tap. Coil 72 includes no tuning capacitor, as such, since the frequency of oscillation is unimportant. By means of capacitor 76 and adjustable feedback capacitor 78, the system is compensated for the mass of the rail to sustain oscillations. Once this adjustment has been made, the circuit becomes responsive to any additional mass above coil 72. In operation the tread of the wheel approaching the coil adds to the capacity and also changes the coil inductance whereby oscillations cease. After the wheel passes over the coil, oscillations are again resumed. Sensitivity adjustment permits the detection of metal 1½ to 2 inches away. This type of circuitry is particularly suitable for use in hot box detectors in that when the tread of the wheel is over the coil, the journal is directly above it also.

The oscillations taken from the cathode of tube 74 are applied to the control grid of amplifier tube 80, thus affording minimum loading of the oscillator. The amplified output is fed through capacitor 82 and diode-resistor-capacitor network 84 to the control grid of relay drive tube 86. The plate circuit of this tube includes relay 88 which actuates switch contact 70.

Diode-resistor-capacitor network 84 develops a high negative voltage on the grid of tube 86 and normally maintains this tube at cut off, whereby relay 88 is deenergized. However, when oscillations cease upon the detection of a wheel by coil 72, tube 86 becomes conductive, relay coil 88 is energized, and switch contact 70 is closed to activate the hot gearing detector circuit of FIG. 2.

Operation

As a train approaches the inspection station, the mass detector means senses a wheel of the train and closes switch 70, thereby activating the hot bearing detector circuit of FIG. 2. Assuming that no infra-red energy is initially applied to cell 8 by a wheel-axle junction 10, the square wave output of multivibrator 26 causes drive tube 24 to be driven to saturation and to cut-off during the positive and negative half cycles, respectively. Since tubes 16 and 24 have a common cathode resistor 22, tube 16 is cut off when tube 24 is saturated. On the other hand, when tube 24 is cut off, tube 16 is energized and functions as an amplifier.

When a wheel-axle junction 10 is positioned opposite housing 4, infrared energy from the junction is directed upon cell 8 by the mirror 6. The resistance of cell 8 changes in accordance with the energy level (i.e., as a function of the wheel-axle temperature) and develops a signal which is applied to the control grid of tube 16. The heat information rides on the negative half of the waveform output of tube 16 as shown schematically in FIG. 2. This waveform is amplified by tube 32 and, owing to the tube reversing action, the heat information rides upon the positive portion of the output waveform of tube 32.

Tube 38, resistor 42 and potentiometer 44 constitute clipping level control means for removing all traces of the multivibrator gating signal from the waveform appearing at the plate of amplifier tube 32. By observing the waveform at test point T.P. 3 when no extraneous heat source is opposite housing 4 and cell 8, the clip level control 44 may be adjusted to remove all trace of the square wave multivibrator gating signal. After this adjustment has been made, it is apparent that the remaining circuitry is responsive solely to the magnitude of the heat information.

The heat signal is now amplified by the intermediate stage amplifier tubes 46 and 50 and is applied—as a positive voltage—to the control grid of relay drive tube 56. Also applied to the control grid of tube 56 is the negative biasing potential the level of which may be adjusted by potentiometer 60. It is apparent that if the magnitude of the positive temperature signal is lower than the negative biasing potential, tube 56 is cut off and alarm circuit 68 is de-activated. On the other hand, if the temperature signal exceeds the biasing potential, tube 56 becomes conductive, relay 64 is energized, and the switch 66 is closed to operate the audible and/or visible alarm. By appropriate settting of potentiometer 60, the alarm circuit will be actuated only when the wheel-junction temperature exceeds a predetermined safe value.

It is apparent that the improved electronic hot box detector obviates the use of mechanical chopper or shutter means and the like whereby a more reliable and accurate monitoring system is obtained. Since each housing 4 is arranged outside the track for substantially vertical viewing of the wheel-axle junction, the device will automatically view a train travelling in either direction. Moreover, all wheel-axle junctions are monitored regardless of wheel base. Owing to the provision and operation of potentiometers 44 and 60, the effects of ambient temperature on the control may be completely eliminated. Consequently, there is no necessity for ambient temperature comparison as is required in many of the relatively complex systems of the prior art.

While in accordance with the provisions of the patent statutes the preferred embodiment of the invention has been illustrated and described, it will be apparent to those skilled in the art that changes may be made in the disclosed apparatus without deviating from the invention set forth in the following claims.

What is claimed is:

1. A hot bearing detector system for railway rolling stock, comprising
   normally deactivated electric alarm means including normally-open relay contacts;
   relay operating means for closing said relay contacts to activate said alarm means, comprising a voltage source, a relay coil energizable to close said relay contacts, and a normally nonconductive electronic device having a pair of power circuit electrodes connecting said coil in series with said source, said electronic device including also a control electrode;
   means applying a direct-current biasing potential of one polarity upon said control electrode for normally maintaining said electronic device nonconductive;
   and temperature-responsive means for applying to said control electrode an amplified signal voltage of opposite polarity than said biasing potential and of a magnitude that is a function of the temperature of each wheel-axle junction of the rolling stock passing a given station, said temperature responsive means comprising stationary pick-up means including a single heat responsive cell for generating a signal voltage that is a function of the journal bearing temperature; multistage amplifier means including an input stage amplifying device having an input terminal connected with said pick-up means, and an output stage amplifying device having an output terminal connected with said control electrode; and multivibrator gating means for alternately rendering said input stage amplifying device conductive and nonconductive, said amplifier means including also signal clipping means connected between said input and output stage amplifying devices for eliminating the effect of said multivibrator gating means and for producing at the output terminal of said output stage amplifying device an amplified signal voltage the magnitude of which is a direct function of the wheel-axle junction temperatuure, whereby when the wheel-axle temperature exceeds a given value, said amplified signal voltage exceeds said biasing potential and said relay driving device is rendered conductive to activate said alarm means.

2. Apparatus as defined in claim 1 wherein said signal clipping means includes adjustable means for selectively controlling the clipping level.

3. Apparatus as defined in claim 2 and further including means for varying the magnitude of said biasing voltage.

4. Apparatus as defined in claim 3 wherein each of said clipping level adjustable means and said biasing voltage varying means comprises variable resistance means.

5. Apparatus as defined in claim 4 wherein said pick-up means comprises at least one housing mounted externally of the track of the rolling stock, a parabolic mirror mounted within said housing, and a lead sulphide cell mounted at the focal point of said mirror.

6. Apparatus as defined in claim 5 wherein the operating frequency of said multivibrator means is on the order of 1000 cycles per second.

7. Apparatus as defined in claim 1, and further including a normally open switch connected in series with said voltage source, said relay coil and said relay driving electronic device, and mass detector means responsive to the presence of the rolling stock adjacent said station for closing said switch.

8. Apparatus as defined in claim 7, wherein said mass detector means includes oscillator means for energizing said relay means only when a wheel of the rolling stock is opposite said pick-up means.

9. Apparatus as defined in claim 8 wherein said oscillator means includes a sensing coil mounted on a rail of the track opposite said pick-up means, said sensing coil having an inductance value normally causing oscillation of said oscillator means when a wheel is remote from said pick-up means, the inductance of said sensing coil being varied by a wheel opposite said pick-up means to interrupt oscillation of said oscillator means, and means responsive to the interruption of oscillation of said oscillator means for energizing said relay means.

References Cited by the Examiner

UNITED STATES PATENTS

| 3,068,448 | 12/1962 | Mountjoy et al. | 340—38 |
| 3,081,399 | 3/1963 | Schwarz | 246—169 |
| 3,108,773 | 10/1963 | Pelino | 340—231 X |

FOREIGN PATENTS

| 665,990 | 7/1963 | Canada. |

ARTHUR L. LA POINT, *Primary Examiner.*

NEIL C. READ, *Examiner.*

R. M. ANGUS, S. T. KRAWCZEWICZ,
*Assistant Examiners.*